United States Patent [19]

Lefevre et al.

[11] 4,264,439
[45] Apr. 28, 1981

[54] SEPARATION OF ANION AND CATION EXCHANGE RESINS IN A MIXED RESIN BED

[75] Inventors: Leonard J. Lefevre, Midland, Mich.; Tetsuo Sato, Albuquerque, N. Mex.

[73] Assignee: The Dow Chemical Company, Midland, Mich.

[21] Appl. No.: 83,150

[22] Filed: Oct. 9, 1979

[51] Int. Cl.³ .............................................. B03B 5/66
[52] U.S. Cl. ................................. 209/454; 209/496; 210/662; 210/675
[58] Field of Search ............................ 209/158–161, 209/454–456, 491, 496; 210/25, 30 R, 32, 33, 36, 96.1, 189; 521/26

[56] References Cited

U.S. PATENT DOCUMENTS

| | | | |
|---|---|---|---|
| 2,617,766 | 11/1952 | Emmett et al. | 210/25 |
| 2,666,741 | 1/1954 | McMullen | 210/30 R |
| 3,172,037 | 3/1965 | Pfeiffer | 210/96.1 |
| 3,797,660 | 3/1974 | Miller | 209/160 |
| 4,120,786 | 10/1978 | Petersen et al. | 209/454 |
| 4,151,332 | 4/1979 | Chong et al. | 210/32 |

*Primary Examiner*—Ivars C. Cintins

[57] ABSTRACT

A mixture of anion and cation exchange resins is separated into their respective resin types by classifying the resin mixture, using a fluid such as water, in the presence of a solid, inert material (e.g., copolymer beads of styrene, divinylbenzene and methyl methacrylate) which, upon classification, forms a layer intermediate between the layers of the anion and cation resins. The degree of resin separation and the location of the layers of the classified anion resin and cation resin are determined by measuring a conductivity property of the resulting classified resin bed.

14 Claims, 4 Drawing Figures

SEPARATION OF ANION AND CATION EXCHANGE RESINS IN A MIXED RESIN BED

BACKGROUND OF THE INVENTION

The present invention relates to a method for separating a mixture of cation and anion exchange resins into their respective resin types.

In the purification of water and other liquids, to remove the undesirable ionic components therefrom, the liquid being purified is often contacted with both anion and cation exchange resins. Although the contaminated liquid can be sequentially contacted with one resin type and thereafter with the other resin type, the liquid is more conventionally contacted with a resin bed containing both the anion and cation exchange resins, i.e., a mixed resin bed.

In such mixed bed ion exchange operations, upon the exhaustion of the resins, e.g., the reduction in the capacity of the resins to a commercially impractical level, the cation and anion exchange resins are separated and the separated resins subsequently regenerated to restore ion exchange capabilities thereto. For the reason that a dilute caustic solution is employed as the regenerant for the exhausted anion exchange resin and a diliute acidic solution for the exhausted cation exchange resin, complete separation of the anion and cation resins is desired prior to regeneration. Any intermixing of the resins resulting from their incomplete separation causes the unseparated resins to be damaged and/or to remain in an exhausted condition following regeneration.

Conventionally, separation involves backwashing the mixed resin bed, i.e., fluidizing the mixed resin bed by passing a water wash up through the bed for a limited time, and thereafter allowing the resins to settle. Since the cation resin is generally more dense than the anion exchange resin, it settles first and stratification of the cation and anion exchange resins occur.

Unfortunately, when using such conventional separation techniques, the interface defining the boundary between the anion and cation exchange resins is often not distinct, i.e., a portion of the separated resin bed contains intermixed anion and cation resins. Therefore, following regeneration of the resulting separated resin bed using conventional regeneration techniques such as defined by U.S. Pat. No. 3,385,787; large, unseparated amounts of each resin remain in their exhausted state.

To facilitate more complete separation, the prior art methods disclosed in U.S. Pat. Nos. 3,429,807 and 3,634,229 propose using a sight glass or the like to monitor the degree of separation and the position of the interface marking the boundary between the layers of the cation and anion resin. Unfortunately, such techniques are not readily adapted to fully automatic facilities and are inherently inaccurate.

To effectively separate the resins in an automated facility, U.S. Pat. No. 4,120,786 proposes a method and apparatus for locating the interface of the anion and cation exchange resins by monitoring the pH of the resin bed, wherein a change in pH indicates the position of the interface. While such method can be employed to continuously monitor the position of the interface in an automated ion exchange facility, the interface remains relatively indistinct causing a portion of each resin to remain in its exhausted condition following regeneration.

In view of the stated deficiencies of the prior art methods, it remains highly desirable to provide a method for effecting complete separation of a resin bed comprising a mixture of anion and cation exchange resins and for accurately determining the position of each resin in the separated resin bed, thereby facilitating the regeneration of each resin type.

SUMMARY OF THE INVENTION

Accordingly, the present invention is a method for separating a resin bed of a mixture of anion and cation exchange resins. In said method, the mixture of the anion and cation exchange resins is classified using a classifying fluid in the presence of a solid, inert material which (a) imparts measurably different conductivity to the classifying fluid than the cation and anion exchange resins and (b) has fluidization characteristics such that, upon classification, it forms an intermediate layer positioned between the layer of cation exchange resin and layer of anion exchange resin. A conductivity property of the resin bed is measured with the conductivity property varying with the degree of separation and the position of the intermediate layer of material.

Using the method of this invention, essentially complete separation of the anion and cation exchange resins is achieved and the location of each resin easily determined, thereby facilitating the regeneration of either resin type without causing damage or the loss of capacity to the other resin type.

Thus, the method of this invention is useful in mixed, single bed, ion exchange operations, particularly in automated type operations, for batchwise or continuously separating the anion and cation exchange resins employed therein.

BRIEF DESCRIPTION OF THE DRAWINGS

Understanding of this invention will be facilitated by referring to the accompanying drawings, in which.

DETAILED DESCRIPTION OF THE PREFERRED EMBODIMENTS

Figure 1:
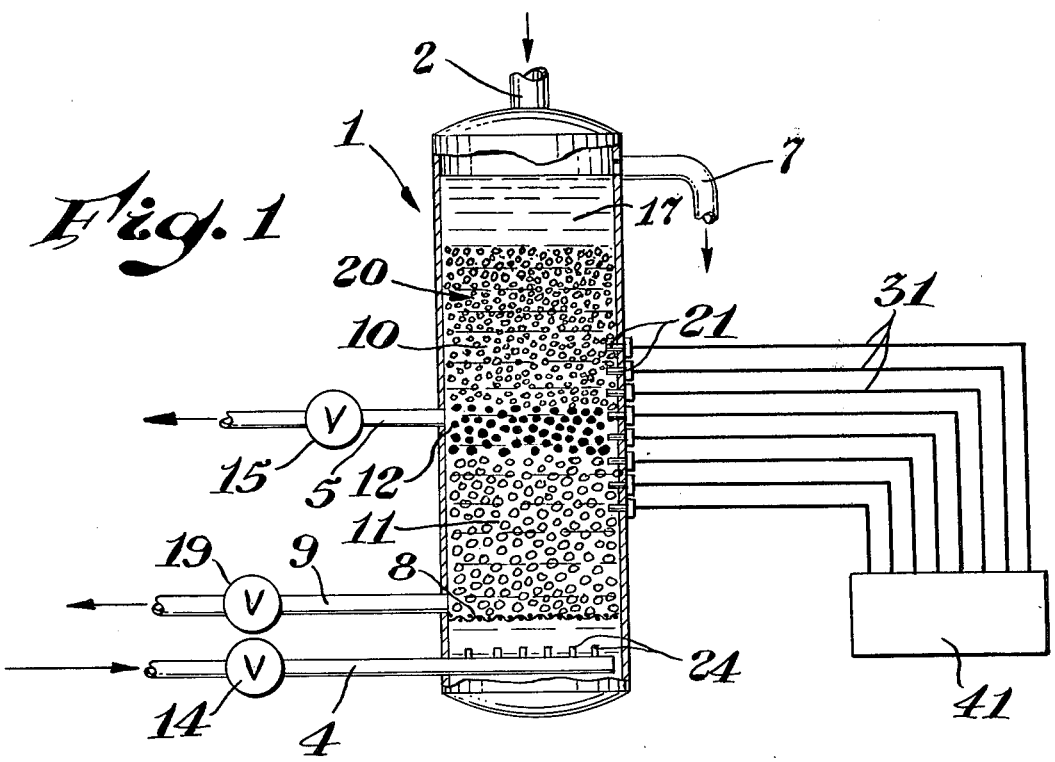
FIG. 1 is a schematic representation, partly in section, illustrating an apparatus useful in the batchwise separation of a resin mixture which apparatus incorporates an embodiment of the present invention.
Figure 2:
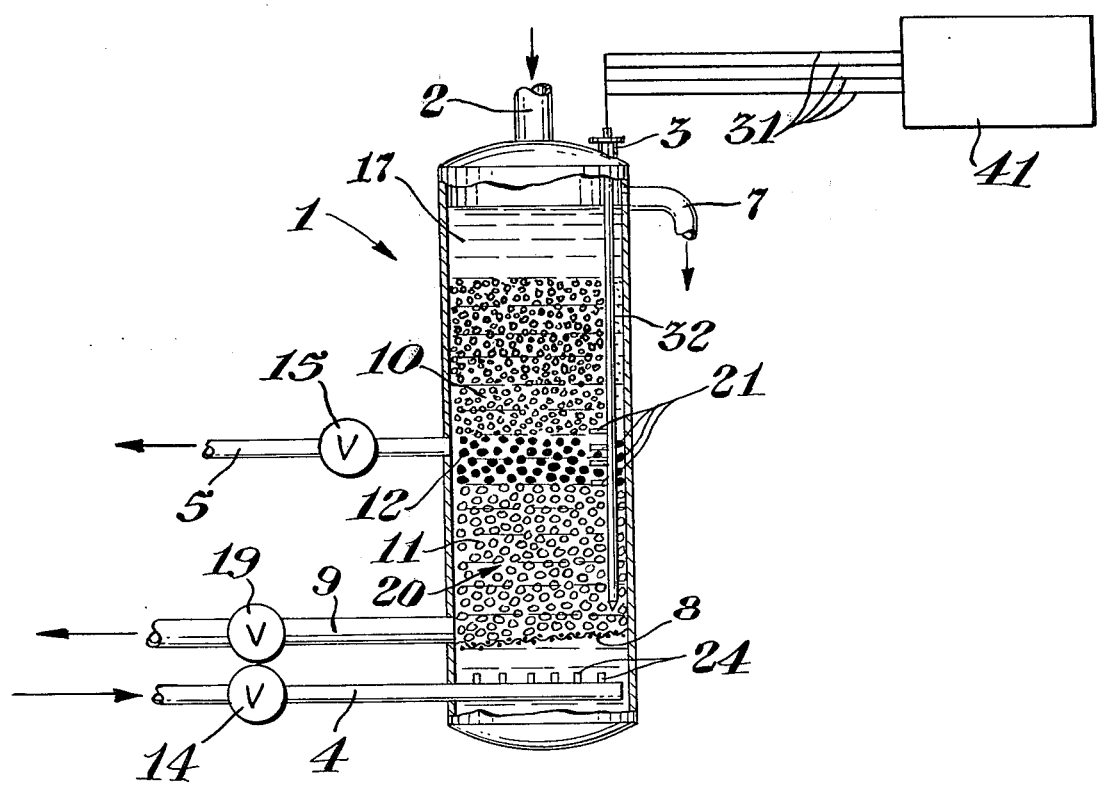
FIGS. 2 and 3 are schematic representations, partly in section, while illustrates a similar apparatus incorporating alternative embodiments of the present invention.

Referring now more particularly to the drawings, FIGS. 1 and 2 depict one of the many conventional apparatuses well known in the art for handling a mixture of anion and cation exchange resins (also referred to herein as a mixed resin bed), wherein each Figure illustrates a different embodiment of the present invention. In each Figure, a separation tank or column 1 is shown containing a mixed resin bed 20, which mixed resin bed is depicted following classification, comprising an anion exchange resin 10, a cation exchange resin 11 and a fluid 17 employed in the classification of the resin bed. A solid, inert material 12 forms a layer intermediate to the layers of the anion resin 10 and the cation resin 11. The solid, inert material imparts to the fluid 17 (said fluid hereinafter being referred to as "classifying fluid") a measurably different conductivity property than the conductivity imparted to the classifying fluid by either the cation or anion resin. Connected to column 1 is a resin inlet conduit 2 for introducing the anion and cation resins and solid, inert material to column 1 and an outlet conduit 7 for removing the classifying fluid from the column 1. Extending perpendicular to the axis of column 1 and at or near its base is a classifying fluid inlet conduit 4 having a plurality of classifying fluid inlets 24 positioned at regular intervals along its length. The other end of conduit 4 communicates with a source of the classifying fluid. Between the opposite ends of conduit 4 is valve 14. A screen or baffle 8 having a plurality of openings of a size such that the classifying fluid passes therethrough but sufficiently small to filter the particles of the anion and cation resins and the solid, inert material is provided above the fluid conduit 4. A cation resin outlet conduit 9 (having a valve 19) is connected to column 1 to remove the cation resin therefrom. Baffle 8 is advantageously slanted toward conduit 9 to facilitate removal of the cation resin thereby. An anion resin outlet 5 (having a valve 15) is connected to column 1 to remove the anion resin therefrom. Anion resin outlet 5 is located such that, following classification, the anion resin 10 can be removed from separation column 1 without removing cation resin 11 therewith.

In a typical operation, a mixture of the anion and cation resins, generally in an exhausted or depleted condition, is fed into separation column 1 by means of resin inlet conduit 2. The solid, inert material 12 is also fed to column 1 through conduit 2 prior to classification of the resin mixture. The classification of the resins, using classifying fluid 17 (hereinafter referred to as "fluidic classification"), into their respective types is advantageously conducted using conventional techniques well known in the art for classifying a mixed resin bed. Representative of such techniques are U.S. Pat. No. 2,578,937 and 2,692,244, which are hereby incorporated by reference. In general, in the illustrated embodiments, fluidic classification comprises feeding the classifying fluid, generally water, through conduit 4 to separation column 1 which contains the resin bed of the intermixed cation and anion exchange resins and the solid, inert material. Outlets 24 and baffle 8 distribute the classifying fluid uniformly as it travels upward through column 1 in a direction generally counter to the flow of the resins and inert material. Valve 14 controls the flow of the classifying fluid such that it has an upward velocity sufficient to fluidize the resins in the resin bed without carrying the resins or inert material out of column 1 through the fluid outlet 7. Upon such fluidization of the resin mixture, classification or stratification of the resins and the inert material occurs. As the cation and anion resins generally have approximately the same particle size and the cation resin generally has a higher density than the anion resin, the cation resin forms a layer on the bottom of the mixed resin bed, with the anion resin forming a separate layer above the cation resin layer. In this invention, the inert material forms a layer which is positioned between the layers of the cation and anion resins.

The degree of separation and the locations of the boundaries marking the interfaces of the anion and cation resin layers with the inert material are determined by measuring a conductivity property of the resin bed. In general, complete separation of the resins into their respective types is facilitated by measuring the conductivity of the classifying fluid during fluidization of the resin mixture and following classification thereof, i.e., the settled resin bed. As depicted in FIG. 1, deposed within the resin bed are a plurality of conductivity sensors 21 positioned such that a conductivity property of the classifying fluid is measured at a number of different levels sufficient to determine the degree of separation and position of the anion and cation resins and the inert material in column 1. The sensors 21 are connected to a recorder means 41 by a series of leads 31. In operation, each sensor transmits a signal proportional to the measured conductivity property to recorder means 41 which registers the property thereon.

Alternatively, in the embodiment of FIG. 2, the conductivity of the classifying fluid is measured by means of a conductivity sensor or, as illustrated, a plurality of conductivity sensors 21 mounted on a moveable support rod 32. From each sensor 21 a lead 31 runs through support rod 32 to recorder means 41. An upper opening 3 in column 1 is provided for receiving support rod 32. In such embodiment, the support rod 32 is dipped through upper opening 3 into the resin bed and a conductivity property of the classifying fluid measured while extending the support rod 32 to various depths therein. Generally, such embodiment provides greater accuracy and flexibility than the fixed sensors depicted in FIG. 1.

In this invention, the conductivity of the classifying fluid containing the solid, inert material is measurably lower than the classifying fluid containing either the exhausted cation or anion resin. For this reason, the measured conductivity property relates to the degree of separation and the location of the interface between the cation resin and inert material and the interface between the anion resin and the inert material in the separation column.

As used herein, the term "the degree of separation" is a measure of the distinctness of the interfaces of the inert material with the cation and anion exchange resin. In general, the sharper and more rapid the change in conductivity, the more distinct are these interfaces, indicating a more complete separation. A gradual change in the conductivity property represents incomplete separation, thereby indicating further classification may be desired.

In the embodiments illustrated by FIGS. 1 and 2, once the desired degree of separation and the location of each interface are obtained, each of the separated resin types can readily be regenerated using conventional techniques well known in the art. For example, with some modifications to separation column 1, both the exhausted anion and cation resins can be regenerated in column 1 by techniques such as described by U.S. Pat. No. 2,736,698 and 2,666,741, both of which are hereby incorporated by reference. More typically, either one or both the anion and cation resins are removed from the separation column 1 prior to regeneration. Generally, transfer of the cation resin is conducted by discharging the cation resin 11 through outlet conduit 9. Similarly, transfer of the anion resin 10 is conducted by means of outlet conduit 5. In the transfer of resin by such techniques, the inert material or portions thereof are generally removed from column 1 with either or both the cation or anion resin.

Figures 3, 4:
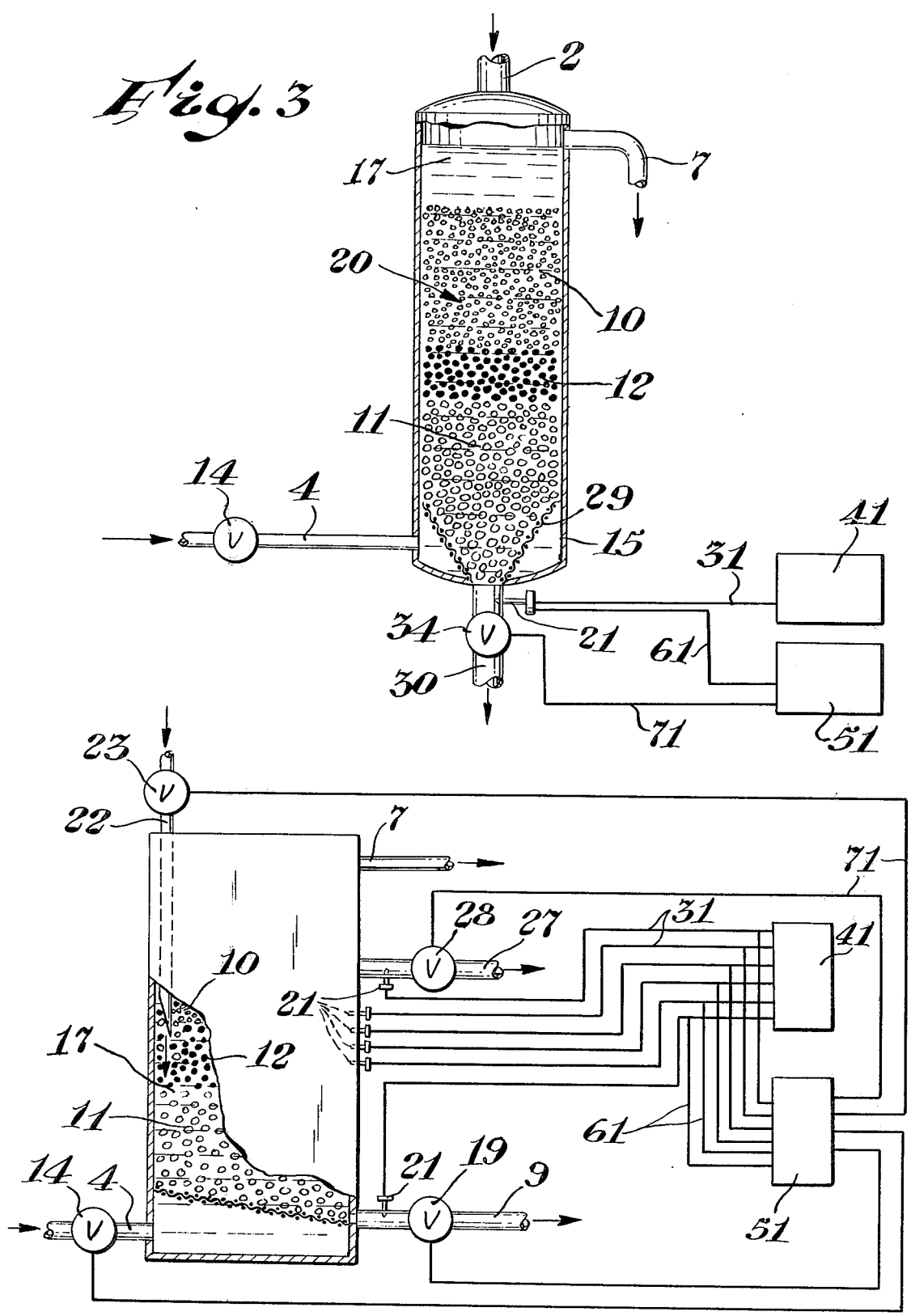
FIG. 4 is a schematic representation, partly in cross-section, of an apparatus useful for continuously separating the resin mixture which apparatus incorporates an embodiment of this invention.

FIG. 3 depicts scehmatically an alternate embodiment of the present invention. In FIG. 3, a fluid distributor 29 comprising a fluid permeable baffle of inverted conical shape occupies the bottom of the column 1. Fluid distributor 29 defines an annular space 15 which acts as a distribution header for the carrier fluid which is introduced into separation column 1 by fluid inlet conduit 4 which communicates column 1 to the source of the classifying fluid. The fluid distributor 29 is impermeable to the passage of the resin and inert material therethrough.

A resin outlet conduit 30 having valve 34 therein is connected to the bottom of column 1. To measure the conductivity of the effluent passing through conduit 30, a sensor 21 is disposed therein above valve 34. Advantageously, sensor 21 is placed at the apex of distributor 9. The sensor 21 is connected to a recorder means 41 by lead 31.

In operation, the mixture of the cation and anion resins and the inert material is classified by techniques hereinbefore described. When classification is complete, to remove the cation resin 11 from separation column 1 such as the transfer the cation resin to a regeneration column, the resin outlet valve 34 is opened and the cation resin allowed to drain from column 1. The sensor 21 continuously monitors a conductivity property of this effluent or transfer stream containing the cation resin and generates a measurable signal which is transmitted to recorder means 41 by lead 31. As the cation resin drains from column 1, the interface of the cation resin and solid, inert material 12 moves down through the column 1. When this interface reaches sensor 21, the recorder means exhibits a distinct change in the conductivity property. Upon this change, valve 34 can be closed to retain the anion resin 10 in column 1. Following removal of the cation resin to a separate regeneration column, the anion resin can be either regenerated in column 1 or transferred from the column to a separate column for regeneration.

Alternatively (or in addition), as depicted in the illustrated embodiment, sensor 21 can be connected to a control unit in which case valve 34 can be automatically controlled. Such control unit consists of computing means 51, connected to sensor 21 by means of lead 61 and to valve 34 by means of lead 71. Upon the change in the conductivity property indicating the interface between the cation resin 11 and inert material 12 has reached sensor 21, computing means 51 transmits a measurable signal through lead 71 which closes valve 34, thereby ceasing the flow of the transfer stream to effectively retain the anion resin 10 in column 1.

In the operation of the embodiment depicted by FIG. 3, the inert material or a portion thereof is generally transferred with the cation resin or remains with the anion resin. Alternatively, the inert material can be segregated from both resin types prior to their separate regeneration. In operations wherein the inert material or any portion thereof is segregated from the resins prior to their regeneration, such segregated, inert material is advantageously recycled to separation column 1 for use in subsequent separation operations.

While the method of the present invention has been heretofore described for batch-type operations, it is also suitably employed in a continuous-type operation as depicted in FIG. 4. In such operation, a mixture of an anion resin and cation resin is continuously fed to separation column 1 through resin inlet conduit 22 having control valve 23 therein. Contained within column 1 are previously introduced cation resin 11, anion resin 10 and inert material 12. The mixture of cation and anion resin is continuously separated by a classifying fluid (supplied by fluid inlet conduit 4 and uniformly distributed by baffle 8) flowing upward through column 1. A cation resin outlet conduit 9 having a control valve 19 therein continuously removes cation resin from column 1, while an anion resin outlet conduit 27, having control valve 28 therein, located above the interface of the separated anion resin and inert material, continuously removes anion resin therefrom. Conductivity properties of the continuously classified resin bed at various levels throughout column 1 are measured by a series of conductivity sensors 21 and registered on a recorder means 41 connected to sensors 21 by leads 31 to determine the position of the layer of anion resin, the layer of cation resin and the layer of inert material in the classified resin bed. In addition (or alternatively) a conductivity property of the effluent streams exiting from separation column 1 is measured in a similar manner. Based on these signals, the process conditions, i.e., the rate at which the resin mixture and classifying fluid are fed to the column and the rate at which the resins exit therefrom, can be controlled such that complete separation of the resins is maintained and the inert material remains at a proper level within column 1. Advantageously, such control is conducted immediately and accurately by a control unit comprising a computing means 51 which receives the measurable signals from sensors 21 by means of leads 61. Means 51 controls the fluid inlet control valve 14, resin inlet control valve 23, cation outlet control valve 19 and anion outlet control valve 28 by feedback leads 71.

With regard to the various components useful in the practice of this invention, a conductivity property of the classified resin bed is measured using a sensor which generates a signal proportional to the conductivity property being measured. By the term "conductive property" it is meant any electrical property of the classifying fluid which is proportional to the conductivity thereof. Advantageously, said conductivity property is the conductance or its inverse (resistance) of the classifying fluid. Sensors conventionally employed heretofore for measuring the conductance of liquids are useful in the practice of this invention. For example, a conductivity cell conventionally having platinum electrodes, often coated with a layer of finely divided platinum black, can be employed. Alternatively, a conductivity probe such as described by U.S. Pat. No. 3,794,913, which is hereby incorporated by reference, can be employed herein. Advantageously, such sensors are sensitive to small changes in conductance.

In the normal practice of this invention, the sensor is employed in combination with a monitor or other control unit suitable for use with the particular sensor employed. It is generally desirable to match the conductivity sensor and monitor. For example, a DS Meter Model 532TI sold by Myron L. Company has been found to effectively monitor the conductivity of a classifying fluid. Other sensors, monitors and their combinations can readily be selected by those in the art.

The terms "cation exchange resin" and "anion exchange resin" (herein referred to generally as cation resin and anion resin) are well known in the art and employed conventionally herein. The cation and anion resins suitably employed in the practice of this invention are resins having sufficiently different properties such that, upon fluidic classification, the resins will separate into a layer which is anion resin rich, i.e., contains more of the anion resin than the cation resin, and a cation resin-rich layer. In general, due to its higher density, the cation resin-rich layer will normally form on the bottom of the classified resin bed. In general, any measurable difference in particle size and/or density of the two resin types will provide the desired stratification or separation of the resin upon fluidic classification. Resins in the form of spheroidal beads having a number average particle size from about 0.15 to about 0.84 mm wherein the number average particle size of the anion resin is within about ±0.2 mm, preferably within about ±0.1 mm, of the number average particle size of the cation resin are advantageously employed herein. Advantageously, with such similarly sized beads, the cation resin has a density which is at least about 0.15, more advantageously at least about 0.2, g/cm$^3$ greater than the anion resin employed therewith.

Typically, conventional anion and cation exchange resins, including both gel and macroporous resins, employed heretofore in ion exchange operations are useful herein. Such resins are well known in the art and representative examples are illustrated in Ion Exchange by F. Helfferich, published in 1962 by McGraw-Hill Book Company, New York and U.S. Pat. Nos. 2,366,007; 2,614,099 and 3,549,562.

The solid, inert materials useful as the intermediate component in the practice of this invention are these solid materials which have fluidization characteristics such that upon fluidic classification of the anion and cation resins and inert material, said material forms a layer positioned between the layer of the cation resin and the layer of anion resin. In addition, as the degree of separation and the position of the resin layers are determined by measuring a conductivity property of the classifying fluid, the inert material necessarily imparts to the classifying fluid a measurably different conductivity property than the conductivity property imparted to the classifying fluid by either the anion or cation resin. For the purposes of this invention, the term "inert" refers to those materials which are sufficiently inert to the classifying fluid and other liquids or liquid solution which contact the material during the practice of this invention such that the inert material retains essentially the same fluidization properties, i.e., the fluidization properties remain such that the inert material will still form an intermediate layer between the resin types upon fluidic classification, following said contact. Preferably, the material is essentially chemically and physically inert to the classifying fluid, the regenerants, e.g., an alkaline solution such as an aqueous sodium hydroxide solution and an acidic solution such as an aqueous sulfuric acid solution, and the liquid being deionized.

In the practice of this invention, any solid, inert material having the desired fluidization properties which imparts a measurably different conductivity to the classifying fluid than either the cation or anion resin can be employed. The inert material is advantageously selected such that the differences in conductivity between the classifying fluid containing the inert material and that fluid containing either the anion or cation resin are maximized. By maximizing these conductivity differences, the accuracy of the determination of the degree of substitution and location of the resin layers is increased. Preferably, the conductivity of the classifying fluid containing the inert material is less than about 20, more preferably less than about 10, most preferably less than about 5, percent of the conductivity of the classifying fluid containing either the anion or cation resin. In general, such inert material is advantageously an ionically neutral material.

In general, the density, size and shape of the solid, inert material will dictate its fluidization characteristics. While granular materials can be employed herein, the inert material is preferably in the shape of spheroidal beads. Although the particle size of said beads can vary widely while still providing suitable characteristics upon fluidic classification, in general, however, the inert, spheroidal beads advantageously have a number average particle size from about 0.075 mm to about 2 mm, preferably from about 0.15 to about 0.84, more preferably from about 0.3 to about 0.7 mm. The inert material advantageously possesses a density which is between the density of the anion resin and the density of the cation resin. Preferably, the density of the inert material differs from the density of both the anion resin and the density of the cation resin by at least about 0.05, more preferably at least about 0.075, g/cm$^3$. More preferably, the density of the inert material is from about 90 to about 110, especially from about 95 to about 105, percent of the average of the densities of the anion and cation resin. Typically, a density from about 1.10 to about 1.22, preferably from about 1.12 to about 1.18, g/cm$^3$ is most preferred.

Representative examples of materials advantageously employed as the solid, inert material herein are copolymers, in spheroidal bead form, of a monovinylidene aromatic such as styrene, a cross-linking agent therefor (e.g., a polyethylenically unsaturated monomer, preferably a polyvinylidene aromatic such as divinylbenzene) and a comonomer such as a halo-substituted ethylenically unsaturated monomer (e.g., vinyl chloride, vinylidene chloride, bromostyrene or chlorostyrene) or an alkyl ester of an $\alpha,\beta$-ethylenically unsaturated carboxylic acid (e.g., methyl methacrylate) which can be copolymerized with the monovinylidene aromatic and the cross-linking agent to yield a copolymer bead having the desired density and size. Alternatively, a copolymer, in spheroidal bead form, of methyl methacrylate, a hydroxylalkyl methacrylate or acrylate wherein the alkyl group has from about 2 to about 6 carbon atoms, and a polyethylenically unsaturated cross-linking agent such as divinylbenzene, divinylnaphthalene, divinylsulfone, ethylene glycol dimethacrylate or the like can be employed.

In general, the amount of each comonomer employed in preparing the inert copolymer beads useful herein is determined by the desired properties of the beads and will typically vary depending on the specific monomers employed. For example, copolymer beads of about 73 parts styrene, from about 0.1 to about 4 (preferably about 2) parts divinylbenzene and from about 8 to about 50 parts vinylidene chloride exhibit a density of from about 1.10 to about 1.22 g/cm$^3$. Alternatively, copolymer beads of 30 parts styrene, from about 0.1 to about 4 (preferably about 2) parts divinylbenzene and from about 15 to about 96 parts methyl methacrylate exhibit densities from about 1.10 to about 1.18 g/cm$^3$. Similar densities can be obtained with a copolymer of from about 51 to about 94 weight percent methyl methacrylate, from about 5 to about 35 weight percent hydroxylalkyl methacrylate or hydroxyalkyl acrylate, preferably methacrylate, and from about 0.5 to about 12 weight percent of a polyethylenically unsaturated cross-linking agent. In general, copolymer beads composed of from about 80 to about 99.9, preferably from about 90 to about 99.5, more preferably from about 95 to about 99, parts of monovinylidene aromatic; from about 0.1 to about 20, preferably from about 0.5 to about 10, more preferably from about 1 to about 5, parts of the polyvinylidene aromatic cross-linking agent and from about 70 to about 96 parts of methyl methacrylate are advantageously employed herein.

The copolymer beads are readily prepared at the desired particle size using conventional suspension polymerization techniques for suspension polymerizing a monovinylidene aromatic, e.g., styrene, with a cross-linking agent therefor. Such techniques are well known in the art and illustrated by Polymer Prcesses, edited by Calvin E. Schildknecht, published in 1956 by Interscience Publishers, Inc., New York, Chapter III, "Polymerization in Suspension," which is hereby incorporated by reference.

The inert material is employed in an amount sufficient to separate the cation and anion resin layers upon fluidic classification, which amount is such that the degree of separation and position of each resin layer can be determined by measuring a conductivity property of the classified resin bed. In general, the inert material is advantageously employed in an amount from about 2 to about 15 volume percent of the total ion exchange resin volume, with about 4 to about 10 volume percent being preferred.

Fluids useful for classifying the anion resin, cation resin and intermediate materials are those fluids conventionally employed heretofore in the classification of conventional mixed resin beds of anion and cation resins. Typically, water is the preferred classifying fluid, although methanol, ethanol, isopropanol and the like can also be employed in a non-aqueous type system.

What is claimed is:

1. A method for separating a resin bed of a mixture of anion and cation exchange resins comprising the steps of:
   (a) classifying the mixture of the cation and anion resins using a classifying fluid in the presence of a solid, inert material which (1) imparts measurably different conductivity properties to the classifying fluid than the cation and anion exchange resin and (2) has fluidization characteristics such that, upon classification, it forms an intermediate layer positioned between the layer of anion resin and layer of cation resin and
   (b) measuring a conductivity property of the resin bed within the conductivity property varies with the degree of separation of the anion and cation resins and the position of the solid, inert material.

2. The method of claim 1 wherein, following classification, the conductivity property of the classified resin bed is measured at a number of different levels throughout the classified resin bed sufficient to determine the degree of separation and position of the resin layers.

3. The method of claim 2 which further comprises the step of measuring a conductivity property of the resin mixture during classification.

4. The method of claim 1 wherein the fluidic classification is conducted in a separation column and said method further comprises the step of removing the cation resin from the column containing the classified resin bed wherein the conductivity property of the resin bed being measured is a continuously property of the effluent stream containing the cation resin, said conductivity property indicating the interface of the cation resin and the solid, inert material.

5. The method of claim 4 further comprising the step of ceasing the flow of the effluent stream, based on the measured conductivity property, to retain the anion exchange resin in the resin bed.

6. The method of claim 5 wherein the cation exchange resin is transferred to a first regeneration column.

7. The method of claim 6 wherein the anion resin is regenerated in the separation column.

8. The method of claim 6 wherein following transfer of the cation resin, the anion resin is transferred to a second regeneration column.

9. The method of claim 1 wherein the solid, inert material is in the form of spheroidal copolymer beads.

10. The method of claim 9 wherein the spheroidal polymer beads have a number average particle size of from about 0.075 to about 2 mm and a density which differs from the density of the anion resin and the density of the cation resin by at least about 0.05 g/cm$^3$.

11. The method of claim 9 wherein the inert material is the copolymerization product of styrene, a cross-linking agent therefor and a halo-substituted ethylenically unsaturated monomer or an alkyl ester of and $\alpha,\beta$-ethylenically unsaturated carboxylic acid.

12. The method of claim 11 wherein the comonomer is methyl methacrylate.

13. The method of claim 9 wherein the conductivity property of the continuously classified resin bed is measured at various levels througout the resin bed to determine the position of the anion resin layer, cation resin layer and inert material in the classified bed, said method further comprising the steps of continuously removing the cation resin from the classified resin bed below the interface of the cation resin and the inert material and continuously removing the anion resin from the classified bed at a level above the interface of anion resin and inert material.

14. The method of claim 1 wherein the fluidic classification and conductivity measurements are conducted continuously.

* * * * *

UNITED STATES PATENT AND TRADEMARK OFFICE
CERTIFICATE OF CORRECTION

PATENT NO. : 4,264,439

DATED : April 28, 1981

INVENTOR(S) : Leonard J. Lefevre, Tetsuo Sato

It is certified that error appears in the above—identified patent and that said Letters Patent is hereby corrected as shown below:

Column 1, line 25, delete "diliute" and insert --dilute--.

Column 2, line 43, delete "while illustrates" and insert --which illustrate--.

Column 4, line 62, delete "scehmatically" and insert --schematically--.

Column 5, line 16, delete the first "the" and insert --to--.

Column 7, line 20, delete "these" and insert --those--; line 35, delete "solution" and insert --solutions--.

Column 8, line 35, delete "hydroxylalkyl" and insert --hydroxyalkyl--; line 57, delete "hydroxylalkyl" and insert --hydroxyalkyl--.

Column 9, line 6, delete "Prcesses" and insert --Processes--; line 46, delete "within" and insert --wherein--.

Column 10, line 9, delete "continuously" and insert --conductivity--; line 22, after the word "following", insert --the--; line 35, delete "and" and insert --an--; line 41, delete "througout" and insert --throughout--; line 48, after the word "of", insert --the--.

Signed and Sealed this

Thirteenth Day of October 1981

[SEAL]

Attest:

GERALD J. MOSSINGHOFF

Attesting Officer

Commissioner of Patents and Trademarks

Notice of Adverse Decision in Interference

In Interference No. 100,941, involving Patent No. 4,264,439, L. J. Lefevre and T. Sato, SEPARATION OF ANION AND CATION EXCHANGE RESINS IN A MIXED RESIN BED, final judgment adverse to the patentees was rendered Nov. 2, 1983, as to claims 1, 4–9 and 14.

[*Official Gazette February 7, 1984.*]